(12) United States Patent
Martin et al.

(10) Patent No.: US 9,752,541 B2
(45) Date of Patent: Sep. 5, 2017

(54) FILTER MEDIA

(71) Applicant: Caterpillar Inc., Peoria, IL (US)

(72) Inventors: Kevin Martin, Washburn, IL (US); Jason Jura, Peoria, IL (US); Bryant Morris, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 14/561,530

(22) Filed: Dec. 5, 2014

(65) Prior Publication Data

US 2016/0160815 A1    Jun. 9, 2016

(51) Int. Cl.
*F02M 35/024* (2006.01)
*B01D 46/52* (2006.01)
*B01D 46/00* (2006.01)

(52) U.S. Cl.
CPC ..... *F02M 35/0245* (2013.01); *B01D 46/0041* (2013.01); *B01D 46/525* (2013.01); *F02M 35/02416* (2013.01)

(58) Field of Classification Search
CPC .............. B01D 46/0041; B01D 46/522; B01D 46/525; B01D 46/526; B01D 46/527; F02M 35/0245
See application file for complete search history.

(56) References Cited

U.S. PATENT DOCUMENTS

| | | | |
|---|---|---|---|
| 4,652,286 A * | 3/1987 | Kusuda | B01D 39/2086 162/152 |
| 5,820,646 A | 10/1998 | Gillingham et al. | |
| 7,997,425 B2 * | 8/2011 | Golden | B01D 25/001 156/60 |
| 8,460,442 B2 | 6/2013 | Wagner et al. | |
| 8,746,462 B2 | 6/2014 | Mbadinga-Mouanda et al. | |
| 2003/0121845 A1 * | 7/2003 | Wagner | B01D 25/001 210/493.1 |
| 2011/0173938 A1 * | 7/2011 | Waibel | B01D 39/1623 55/498 |
| 2011/0186504 A1 | 8/2011 | Rocklitz | |
| 2012/0118814 A1 | 5/2012 | Moy et al. | |

FOREIGN PATENT DOCUMENTS

| | | |
|---|---|---|
| EP | 1681087 | 7/2006 |
| JP | 2008055331 | 3/2008 |

* cited by examiner

*Primary Examiner* — Robert Clemente
(74) *Attorney, Agent, or Firm* — Bart A. Fisher

(57) ABSTRACT

A filter media includes flutes, forward plugs, and aft plugs. Each of the flutes has a forward flute face, an aft flute face, and a flute body defining a flute conduit to convey the fluid. The forward plugs are disposed in alternating ones of the flutes. Each forward plug includes a plug base and an aerodynamic plug nose. The aerodynamic plug nose has a center axis and a nose surface tapering outwardly from the center axis towards the plug base. The plug nose is configured to aerodynamically redirect a flow of the fluid away from the center axis. The flutes that have forward plugs include a flute outlet disposed at the aft flute face. The aft plugs are disposed in the flutes adjacent to the flutes that have corresponding forward plugs. The flutes that have aft plugs include a flute inlet disposed at the forward flute face.

20 Claims, 4 Drawing Sheets

FILTER MEDIA

TECHNICAL FIELD

This patent disclosure relates generally to a filter media and, more particularly, to a filter media for filtering air and other fluids in an internal combustion engine.

BACKGROUND

Filter elements are known to filter particles or other contaminants from fluid such as air, fuel, coolant, and the like. In general, a large surface area of filter media in the filter element facilitates efficient filtering of the fluid. To provide this large surface area, the filter media is typically pleated. Another filtering method utilizes an 'in-line' filter media or a media of flutes with alternating ends of adjacent being closed so that fluid entering one flute is forced through the wall of the flute and filtered as it passes into an adjacent flute to exit the media. This type of filter media may perform better than pleated media in some applications depending on the fluid flow rates and shape of the filter canister.

However, because every other flute is blocked, when incoming fluid strikes the blockages, an area of turbulence may be generated in front of and around the blocked opening. This area of turbulence may impede air from entering the adjacent open flute. In an attempt to address this issue, U.S. Pat. No. 8,460,442 ("the '442 patent") provides a sloping surface at the face of each plugged flute. Unfortunately, while this sloping surface does offer some improvement over a perpendicular face, the sloping face of the '442 patent does channel fluid up under the row of flutes above. When this diverted flow strikes the underside of the above row, the fluid may be forced to flow outwardly and across the flow of fluid entering the adjacent open flutes and impede the flow of fluid into the open flutes.

Accordingly, there is a need for an improved filter to address the problems described above and/or problems posed by other conventional approaches.

SUMMARY

The foregoing needs are met, to a great extent, by aspects of the present disclosure, wherein in one respect a filter media is provided that in some aspects addresses the problems posed by other conventional approaches.

An aspect relates to a filter media to filter a fluid passing therethrough. The filter media includes a plurality of parallel flutes, a plurality of forward plugs, and a plurality of aft plugs. Each of the plurality of parallel flutes has a forward flute face, an aft flute face, and a flute body positioned between the forward flute face and the aft flute face. The flute body defining a flute conduit to convey the fluid therethrough. The flute conduit has a flute wall defined by a filter substrate. The fluid is filtered by passing through the filter substrate. The plurality of forward plugs are disposed in alternating ones of the plurality of parallel flutes. Each forward plug includes a plug base and an aerodynamic plug nose. The plug base is configured to mate with a corresponding forward flute face. The aerodynamic plug nose has a center axis and a nose surface tapering outwardly from the center axis towards the plug base. The plug nose is configured to aerodynamically redirect a flow of the fluid away from the center axis. The alternating ones of the plurality of parallel flutes that have respective forward plugs include a respective flute outlet disposed at the aft flute face. The plurality of aft plugs are disposed in ones of the plurality of parallel flutes adjacent to the plurality of parallel flutes that have corresponding forward plugs. The ones of the plurality of parallel flutes that have aft plugs include a respective flute inlet disposed at the forward flute face.

Another aspect pertains to a filter element to filter a fluid passing therethrough. The filter element includes a filter element body and a filter media. The filter element body has an element inlet and an element outlet. The filter media is disposed within the filter element body. The filter media includes a plurality of parallel flutes, a plurality of forward plugs, and a plurality of aft plugs. Each of the plurality of parallel flutes has a forward flute face, an aft flute face, and a flute body positioned between the forward flute face and the aft flute face. The flute body defining a flute conduit to convey the fluid therethrough. The flute conduit has a flute wall defined by a filter substrate. The fluid is filtered by passing through the filter substrate. The plurality of forward plugs are disposed in alternating ones of the plurality of parallel flutes. Each forward plug includes a plug base and an aerodynamic plug nose. The plug base is configured to mate with a corresponding forward flute face. The aerodynamic plug nose has a center axis and a nose surface tapering outwardly from the center axis towards the plug base. The plug nose is configured to aerodynamically redirect a flow of the fluid away from the center axis. The alternating ones of the plurality of parallel flutes that have respective forward plugs include a respective flute outlet disposed at the aft flute face. The plurality of aft plugs are disposed in ones of the plurality of parallel flutes adjacent to the plurality of parallel flutes that have corresponding forward plugs. The ones of the plurality of parallel flutes that have aft plugs include a respective flute inlet disposed at the forward flute face.

Yet another aspect relates to a filter assembly. The filter assembly includes a housing inlet, a housing outlet and a housing body having an internal volume to house a filter element. The filter element includes a filter element body and a filter media. The filter element body has an element inlet and an element outlet. The filter media is disposed within the filter element body. The filter media includes a plurality of parallel flutes, a plurality of forward plugs, and a plurality of aft plugs. Each of the plurality of parallel flutes has a forward flute face, an aft flute face, and a flute body positioned between the forward flute face and the aft flute face. The flute body defining a flute conduit to convey the fluid therethrough. The flute conduit has a flute wall defined by a filter substrate. The fluid is filtered by passing through the filter substrate. The plurality of forward plugs are disposed in alternating ones of the plurality of parallel flutes. Each forward plug includes a plug base and an aerodynamic plug nose. The plug base is configured to mate with a corresponding forward flute face. The aerodynamic plug nose has a center axis and a nose surface tapering outwardly from the center axis towards the plug base. The plug nose is configured to aerodynamically redirect a flow of the fluid away from the center axis. The alternating ones of the plurality of parallel flutes that have respective forward plugs include a respective flute outlet disposed at the aft flute face. The plurality of aft plugs are disposed in ones of the plurality of parallel flutes adjacent to the plurality of parallel flutes that have corresponding forward plugs. The ones of the plurality of parallel flutes that have aft plugs include a respective flute inlet disposed at the forward flute face.

There has thus been outlined, rather broadly, certain aspects of the disclosure in order that the detailed description thereof herein may be better understood, and in order that the present contribution to the art may be better appreciated. There are, of course, additional aspects that will be described below and which will form the subject matter of the claims appended hereto.

In this respect, before explaining at least one example in detail, it is to be understood that the disclosure is not limited in its application to the details of construction and to the arrangements of the components set forth in the following description or illustrated in the drawings. The disclosed device and method is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the claims be regarded as including such equivalent constructions insofar as they do not depart from the spirit and scope of the various aspects.

DETAILED DESCRIPTION

Figure 1:
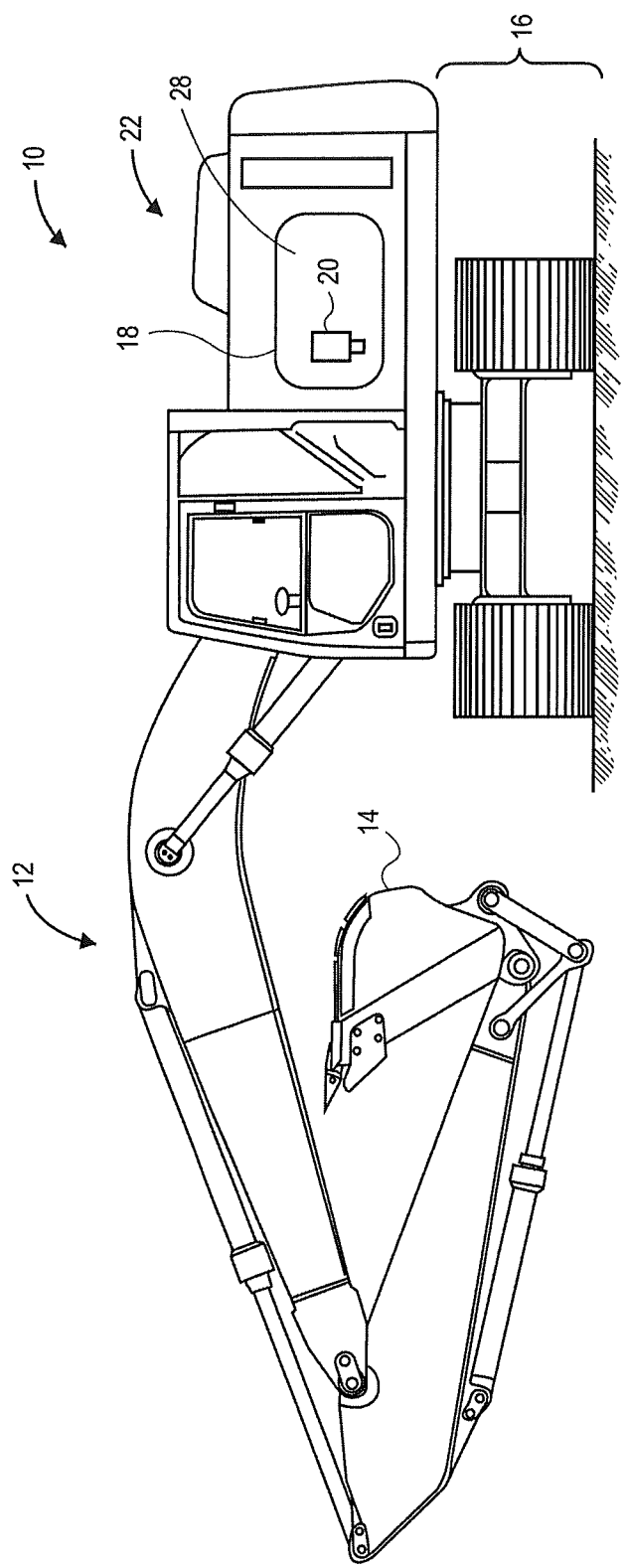
FIG. 1 is a perspective view illustrating an exemplary machine, according to an aspect of the disclosure.

FIG. 1 illustrates an exemplary machine 10 having various systems and components that cooperate to accomplish a task. The machine 10 may embody a fixed or mobile machine that performs some type of operation associated with an industry such as mining, construction, farming, transportation, power generation, or another industry known in the art. For example, the machine 10 may be an earth moving machine such as an excavator (shown in FIG. 1), a dozer, a loader, a backhoe, a motor grader, a dump truck, or another earth moving machine. The machine 10 may include an implement system 12 configured to move a work tool 14, a drive system 16 for propelling the machine 10, a power source 18.

In a particular example, the power source 18 includes an internal combustion engine 28 configured to combust a fuel in the presence of air. The internal combustion engine 28 may be a compression ignition engine, such as a diesel engine or a homogeneous charge compression ignition (HCCI) engine, for example, or a spark ignition engine. Although not shown, a fuel system for the internal combustion engine 28 may include other conventional components such as fuel filters, fuel injectors, and the like. In addition, other conventional components such as various filters, spark plugs or glow plugs, valves, controllers, and the like are suitable for use with various aspects of the power source 18. Examples of suitable fuels for the internal combustion engine 28 include natural gas, gasoline, diesel, or any other combustible fuel known in the art. The air to oxidize the fuel may be filtered through a filter assembly 20. As air passes through the filter assembly 20, contaminants such as dirt, debris, and the like are filtered out and collect in the filter assembly 20. Periodically, the filter assembly 20 is inspected to determine if a filter medium (described further herein) disposed within the filter assembly 20 should be replaced. For example, if sufficient debris has collected on the filter medium, the filter medium may be replaced.

In general, the amount of power produced by the power source 18 is proportional to the amount of fuel and air provided to the internal combustion engine 28. As described herein, it is an advantage of embodiments of the filter assembly 20 that the filter assembly 20 and the filter media therein is capable of filtering relatively high flow rates of air in comparison to convention filter media of a similar size.

Figure 2:
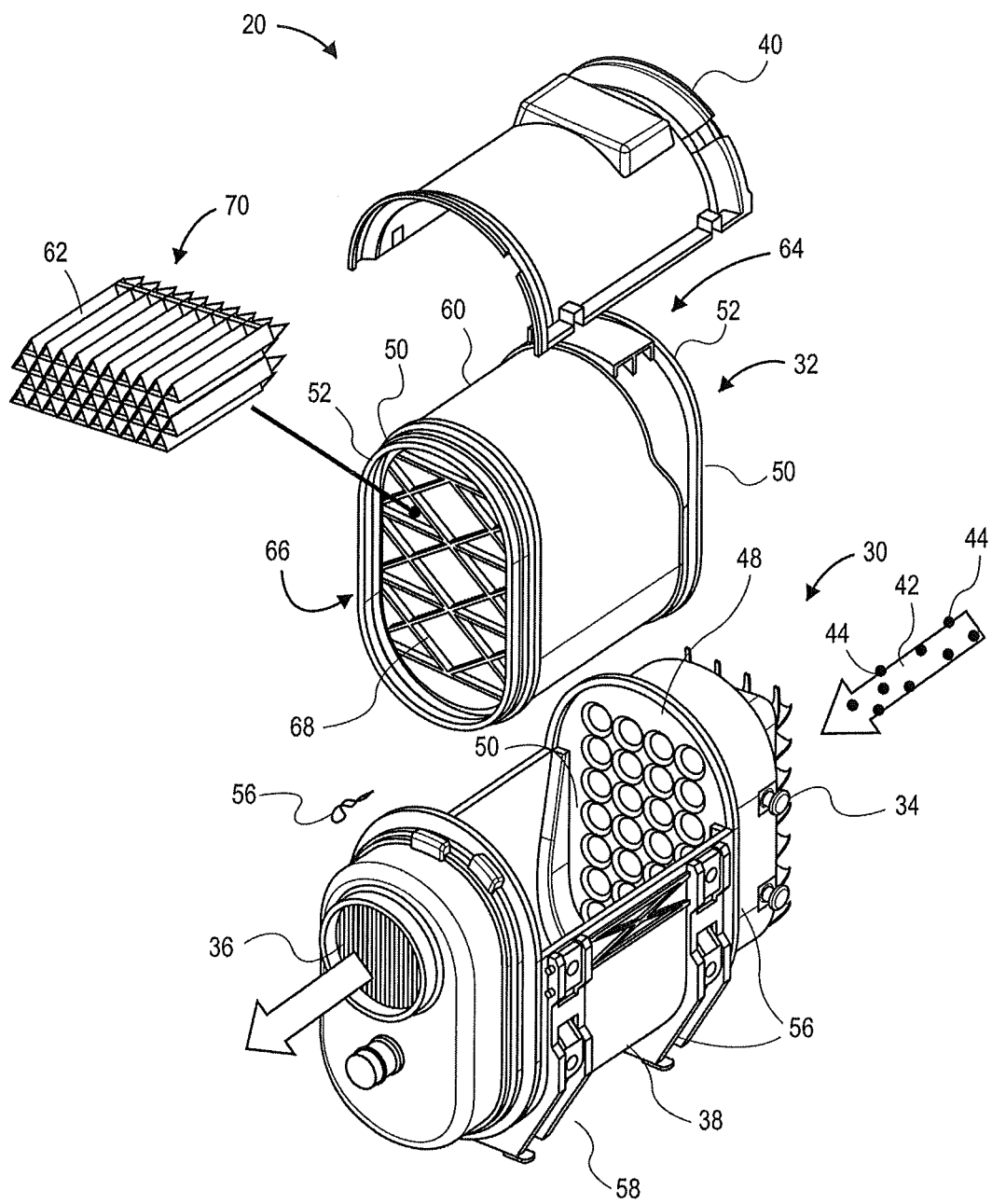
FIG. 2 is an exploded view of a filter assembly according to an aspect of the disclosure.

FIG. 2 is an exploded view of the filter assembly 20 according to an aspect of the disclosure. As shown in FIG. 2, the filter assembly 20 includes a filter housing 30 and a filter element 32. The filter housing 30 includes a housing inlet 34, a housing outlet 36, a housing body 38, and an element access 40. The housing inlet 34 is configured to receive a flow of air 42 that may include a plurality of particles 44 suitable for being filtered from the flow of air 42. This flow of air 42 may directly enter the housing inlet 34 and/or may be directed towards the housing inlet 34 via any suitable well known components or assembly of components such as, for example, an inlet stack (not shown), pre-cleaner (not shown), bellows (not shown), and the like. Optionally, the housing inlet 34 may include a baffle 48. If included, the baffle 48 may be configured to distribute the flow of air 42 across the face of the filter element 32.

The housing outlet 36 is configured to provide the flow of air 42 to the internal combustion engine 28. While not shown, the housing outlet 36 is configured to fluidly couple to any suitable well known component or set of components for conveying the flow of air 42 from the filter housing 30 to the internal combustion engine 28. Examples of suitable components include and air intake manifold, turbocharger, plenum, and the like.

The housing body 38 is generally configured to protect and contain the filter element 32 and, more specifically, direct the flow of air 42 through the filter element 32. In this regard, the housing body 38 and the filter element 32 include one or more pair of mating surfaces 50 each pair of mating surfaces 50 is configured to form a seal to reduce or prevent the flow of air 42 from flowing around, rather than through, the filter element 32. In addition to the mating surfaces 50, an O-ring 52 or other such elastomeric sealing element may be included on the housing body 38 and/or the filter element 32.

Optionally, the housing body 38 may include any suitable fastener 56 configured to retain the element access 40 on the housing body 38. In addition, the housing body 38 may, optionally, include a mount 58 or the like to facilitate mounting the filter assembly 20 on or near the power source 18 shown in FIG. 1.

The filter element 32 includes an element housing 60 to house a filter media 62. The element housing 60 includes the mating surface 50 and/or the O-ring 52. In addition, the element housing 60 includes an element inlet 64, an element outlet 66, and a media retainer 68. The element inlet 64 is configured to allow the flow of air 42 to enter the filter media 62. The element outlet 66 is configured to allow the flow of air 42 to exit the filter media 62 after having been filtered by the filter media 62. The media retainer 68 is configured to retain, protect and reinforce the filter media 62 within the element housing 60.

The filter media 62 is configured to filter the particles 44 from the flow of air 42. However, the filter media 62 need not be limited to filtering particles from air, but rather, the filter media 62 of other examples may be suitable to filter particles or other suitable materials from any suitable fluid such as oil, fuel, and the like. It is an advantage of some aspects described herein that the filter media 62 facilitates a relatively high velocity flow of fluid in comparison to conventional filter media by reducing back pressure at a media face 70. As described herein, in comparison to conventional filter media, the geometry of structures on the media face 70 facilitate an improvement in flow characteristics of incoming fluid (e.g., the flow of air 42). Examples of improved flow characteristics disclosed herein include an increase in effective orifice diameter and a reduction in a leading edge effect.

Figure 3:
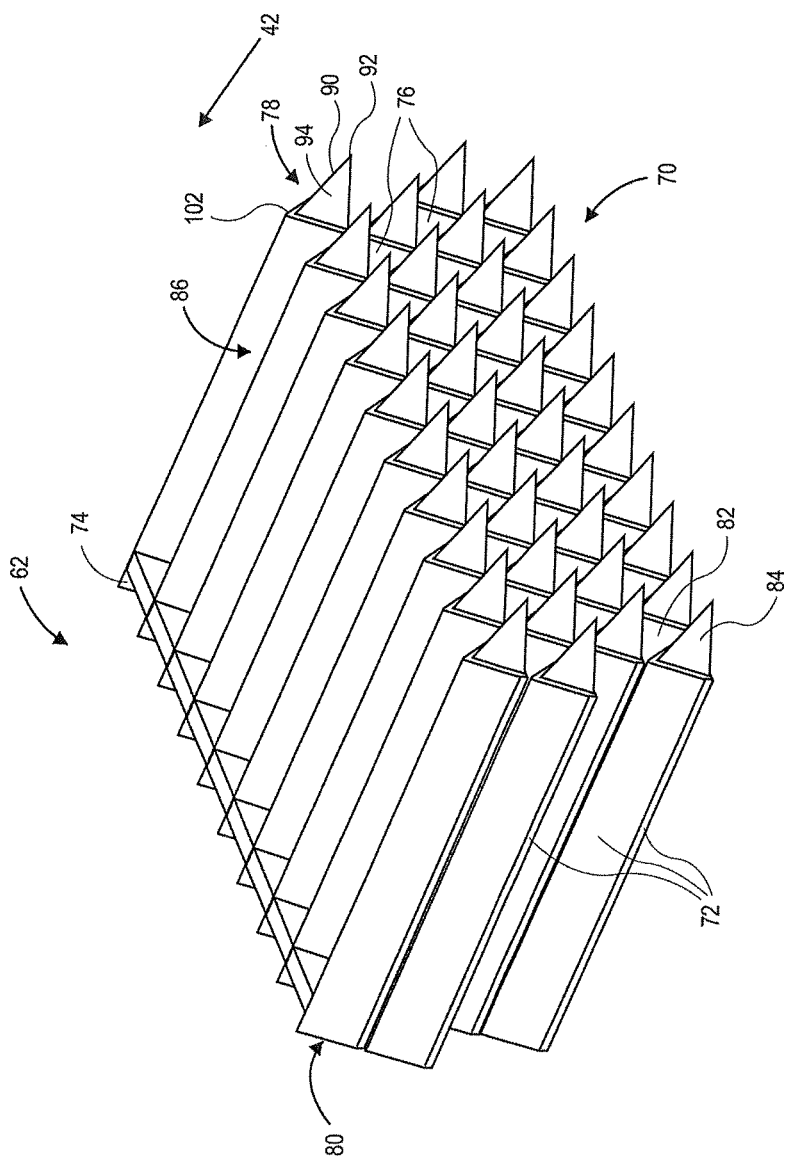
FIG. 3 is a perspective view of a filter media according to another aspect of the disclosure.

FIG. 3 is a perspective view of the filter media 62 according to an aspect of the disclosure. As shown in FIG. 3, the filter media 62 includes a plurality of flutes 72. The flutes 72 are parallel to one another and arranged in line with the flow of air 42. Half of the flutes 72 include a respective aft plug 74 and an orifice or a flute inlet 76. The other half of the flutes 72 include a respective forward plug 78 and an aft outlet 80. For the purposes of this disclosure, ones of the flutes 72 with the flute inlets 76 will be referred to as an upstream flute 82 and ones of the flutes 72 with the aft outlets 80 will be referred to as a downstream flute 84.

As shown in FIG. 3, the upstream flutes 82 alternate with the downstream flutes 84 and, in general, each of the upstream flutes 82 shares a common substrate wall 86 with an adjacent one of the downstream flutes 84. In the particular example shown, the flutes 72 are triangular in cross section and, thus, each of the upstream flutes 82 shares a respective common substrate wall 86 with three adjacent ones of the downstream flutes 84. However, in other examples, the cross section of the flutes 72 may be square, rectangular, hexagonal, or the like and the number of adjacent flutes may vary accordingly.

Of particular note, each forward plug 78 includes a plug nose 90 having an apex 92 and a nose surface 94. As described herein, the apex 92 coincides with a center axis 100 (shown in FIGS. 4 and 5) and the nose surface 94 tapers outwardly from the apex 92 to a forward plug base 102. As a result of the nose surfaces 94 tapering from the apex that is centrally located, reduction of the apparent aperture is reduced (shown in FIGS. 6 and 7). As such, the media face 70 reduces impedance or back pressure of the flow of air 42.

According to various aspects disclosed herein, the forward plug 78 and/or the aft plug 74 may be made from any suitable material. Examples of suitable materials include polymers, resins, and/or any material that can be formed into the appropriate shape and affixed to the flutes 72. In a particular example, the forward plug 78 and/or the aft plug 74 may be formed with a thermoplastic such as acrylonitrile butadiene styrene (ABS), nylon, polyethylene, and the like. The aft plug 74 may be formed by applying a line of a heated thermoplastic across the aft portion or aft face of the upstream flutes 82 and then, while the thermoplastic is above the melting point, a row of downstream flutes 84 may be disposed there upon. In this manner, the aft plug 74 may be formed in the upstream flute 82. The forward plug 78 may be formed by injecting the heated thermoplastic into a forward portion or face of the downstream flutes 84 and drawing the injector back while the thermoplastic solidifies. In this manner, the nose surface 94 may be formed into the various shapes disclosed herein. In other examples, preformed forward plugs 78 may be affixed to the downstream flutes 84. In yet another example, the nose surface 94 may be formed by folding the common substrate wall 86 to generate a tapered point extending out from the downstream flute 84.

Figure 4:
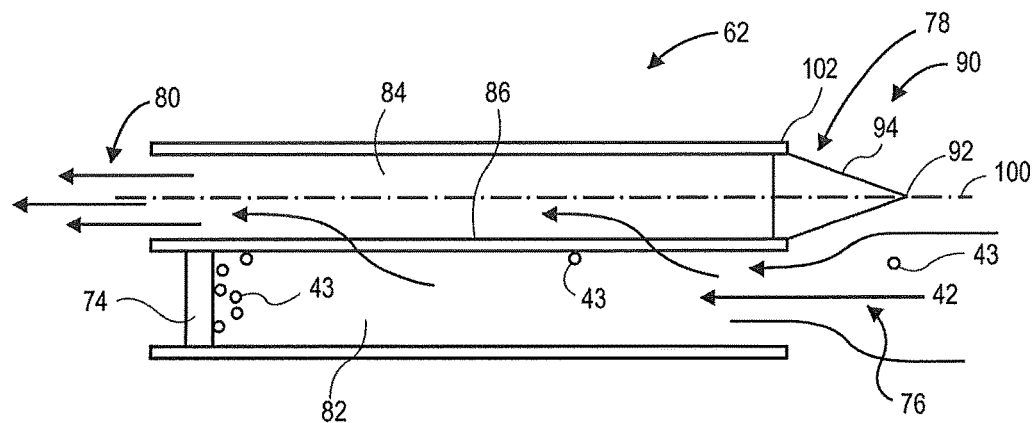
FIG. 4 is a simplified top view of a pair of adjacent flutes of the filter media according to an aspect of the disclosure.

FIG. 4 is a simplified top view of a pair of adjacent flutes 72 of the filter media 62 according to an aspect of the disclosure. As shown in FIG. 4, the flow of air 42 enters the flute inlet 76 and then is urged to pass through the common substrate wall 86 due to the blockage caused by the aft plug 74. Depending upon the filtering properties of the common substrate wall 86, the particles 43 may be prevented from passing through the common substrate wall 86. In this regard, the common substrate wall 86 may include any suitable filtering substrate. Examples of suitable filtering substrates include spun, woven, felted, or matted fibers, pored filter substrate, or the like. In a particular example, the filtering substrate includes a felted fiberboard. The fibers may include class, ceramic, polymers, or the like.

Also shown in FIG. 4, the apex 92 coincides with the center axis 100 and the nose surface 94 tapers from the apex 92 towards the forward plug base 102. This taper of the nose surface 94 diverts or urges the flow of air 42 into the flute inlet 76. It is an advantage of some aspects that the apex 92 being located along the center axis 100 of the downstream flute 84 facilitates a flow that may be more even, uniform, and/or laminar than flutes having blunt faces or faces that taper from a point other that the center axis 100.

Figure 5:
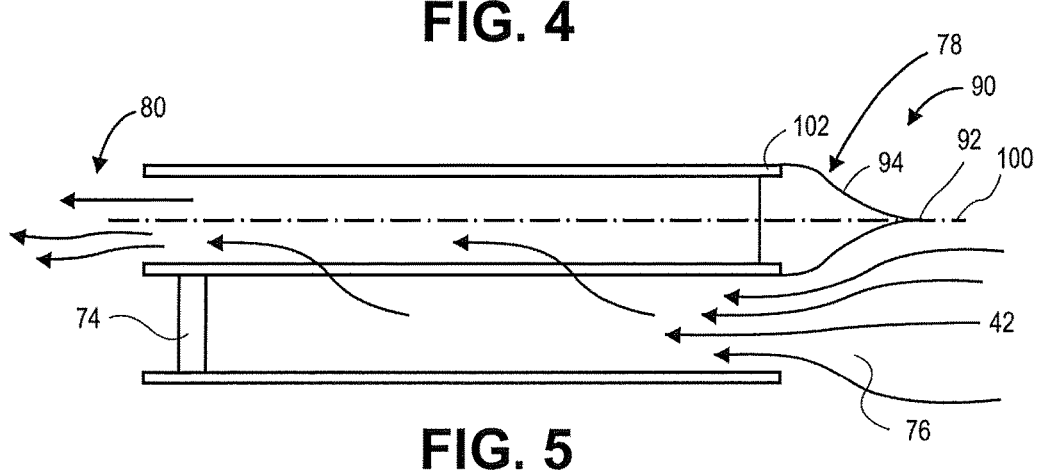
FIG. 5 is a simplified top view of another pair of adjacent flutes of the filter media according to an aspect of the disclosure.

FIG. 5 is a simplified top view of another pair of adjacent flutes 72 of the filter media 62 according to an aspect of the disclosure. As shown in FIG. 5, the nose surface 94 is an ogee or double curved surface rotated about the center axis 100 rather than a pyramidal or conical nose surface 94 of the example shown in FIGS. 3 and 4. However, the ogee nose surface 94 of this example is similar to the example of FIGS. 3 and 4 in that the apex 92 coincides with the center axis 100 and the nose surface 94 tapers outwardly and back towards the forward plug base 102.

In addition, although not shown in FIG. 5, the nose surface 94 is not limited to pyramidal, conical, and ogee shapes, but rather, the nose surface 94 may include any suitable geometry. Examples of suitable shapes for the nose surface 94 include those with relatively low drag and/or improved boundary layer adherence to the surface (e.g., laminar flow along the surface). Particular examples of suitable shapes for the nose surface 94 include tangent ogive, spherically blunted tangent ogive, secant ogive, elliptical, parabolic, and the like. In each case, the shapes described may be rotated about the center axis 100 or may describe a shape of the nose surface 94 define by an edge of the flute inlet 76, the intersection of the adjacent the nose surfaces 94, and the apex 92.

Figure 6:
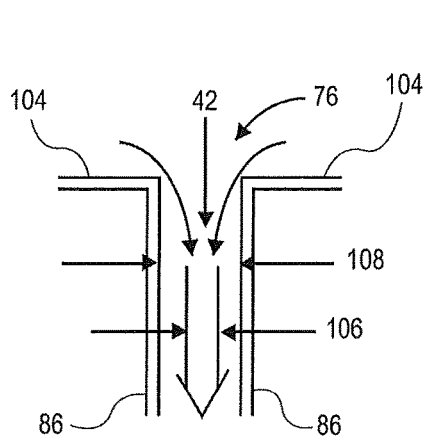
FIG. 6 is a simplified view of flow into a sharp edged orifice according to an aspect of the disclosure.

FIG. 6 is a simplified view of flow into a sharp edged orifice according to an aspect of the disclosure. As shown in FIG. 6, in response to a blunt face 104 being disposed to the sides of the flute inlet 76, an effective orifice diameter 106 is relatively reduced in in comparison to an actual orifice diameter 108 defined by the common substrate walls 86. In the particular example shown, the effective orifice diameter 106 is about 0.65 times the actual orifice diameter 108 due to a leading edge effect observed in fluid flowing through small orifices.

Figure 7:
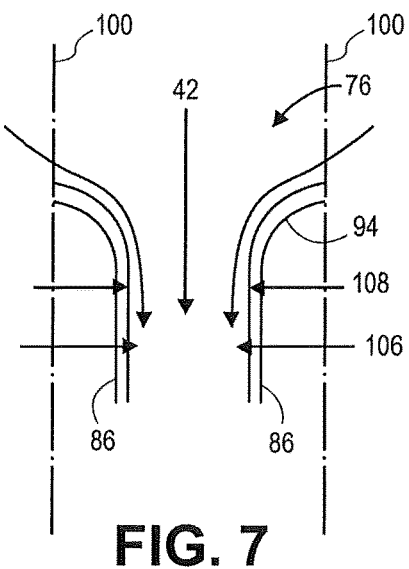
FIG. 7 is a simplified view of flow into a contour edged orifice according to an aspect of the disclosure.

FIG. 7 is a simplified view of flow into a contour edged orifice according to an aspect of the disclosure. As shown in FIG. 7, the effective orifice diameter 106 is essentially equal to the actual orifice diameter 108 in response to providing an aerodynamic surface for the nose surface 94.

INDUSTRIAL APPLICABILITY

The present disclosure may be applicable to any filter for filtering a fluid, any filter assembly having a filter media disposed therein, and any machine having a fluid to be filtered. Aspects of the disclosed filter media, filter unit, and filter assembly may promote improved filter performance in terms of volume of fluid filtered and velocity of fluid filtered, operational flexibility, and improved power output from a power supply having the improved filter assembly.

Applicant discovered that by modifying the forward plug 78 of a filter media 62 shown in FIG. 3, the filter media 62 exhibited better performance in terms of reduced backpressure, increased volume throughput, and increased velocity of fluid being filtered. More particularly, Applicants discovered that introducing the flow of air 42 into the flute inlet 76 in an aerodynamic manner by modifying the plug nose 90 to aerodynamically divert the flow of air 42 into the flute inlet 76 shown in FIG. 4, a greater volume and/or velocity of the flow of air 42 could be filtered by the filter media 62. This aerodynamic plug nose 90 facilitated a reduction in back pressure and, as shown in FIGS. 6 and 7, increased the effective orifice diameter 106. Specifically, the use of a nose surface 94 having the apex 92 that coincides with the center axis 100 facilitates a smooth introduction of the flow of air 42 approaching a laminar flow. Applicants noted conventional blunt-faced flutes and wedge shaped flutes failed to provide these same advantages because the effective orifice diameter is constricted and/or the air is not introduced evenly from all sides.

According to an aspect of the disclosure shown in FIG. 3, the improved filter media 62 is an elegant and uncomplicated solution to increase filtration performance by generating a smooth and even introduction of the flow of air 42 into the flute inlets 76 evenly and from all adjacent plug noses 90. This improvement to the flow of air 42 is made without increasing the surface area of the filter media 62. Thus, for a given size, the filter media 62 may offer improved filtration performance and/or the filter media 62 may be reduced in size to offer reduced material cost, reductions in other associated costs, improvements to placement of the filter assembly 20 in and around the power source 18, and the like.

According to various aspects of the disclosure shown in FIGS. 3-5, the plug noses 90 may be formed in or inserted into the upstream flutes 82 in a variety of suitable manners. In these various methods, the plug noses 90 are configured to evenly taper towards the center axis 100 of the upstream flutes 82. For example, a heated thermoplastic may be inserted in the forward portion or forward face of the upstream flute 82 and drawn outward in line with the center axis 100 to form the tapering plug nose 90. In another example, the forward plug 78 may be pre-formed and affixed to the forward face of the upstream flute 82. In yet another example, the common substrate wall 86 may be folded inward towards the center axis 100 to form the plug nose 90. Thus, depending upon the particular shape of the plug nose 90 and/or other manufacturing considerations, the forward plug 78 may be formed and/or affixed within the upstream flute 82 in a variety of different ways.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified. The many features and advantages of the various aspects are apparent from the detailed specification, and thus, it is intended by the appended claims to cover all such features and advantages that fall within the true spirit and scope of the aspects. Further, since numerous modifications and variations will readily occur to those skilled in the art, it is not desired to limit the aspects to the exact construction and operation illustrated and described, and accordingly, all suitable modifications and equivalents may be resorted to, falling within the scope of the various aspects.

We claim:

1. A filter media to filter a fluid passing therethrough, comprising:
   a plurality of parallel flutes, each flute having:
      a forward flute face;
      an aft flute face; and
      a flute body positioned between the forward flute face and the aft flute face, the flute body defining a flute conduit to convey the fluid therethrough, the flute conduit having a flute wall defined by a filter substrate, wherein the fluid is filtered by passing through the filter substrate;
   the plurality of parallel flutes comprising a set of upstream flutes and a set of downstream flutes alternatively disposed, wherein each downstream flute of the set of downstream flutes is placed adjacent to an upstream flute of the set of upstream flutes, wherein each downstream flute of the set of downstream flutes comprises a forward plug including:
      a plug base configured to mate with a corresponding forward flute face; and
      an aerodynamic plug nose having a center axis and a nose surface tapering outwardly from the center axis towards the plug base, the plug nose being configured to aerodynamically redirect a flow of the fluid away from the center axis into the upstream flute placed adjacent to each downstream flute, wherein each downstream flute includes a flute outlet disposed at the aft flute face of each downstream flute, and
   wherein each upstream flute of the set of upstream flutes comprises an aft plug disposed on the aft flute face of each upstream flute, wherein each upstream flute includes a flute inlet disposed at the forward flute face, wherein at least one of the forward plug or the aft plug is formed of a material different than the filter substrate.

2. The filter media according to claim 1, wherein the nose surface is a pyramidal surface.

3. The filter media according to claim 1, wherein the nose surface is an ogee surface rotated about the center axis.

4. The filter media according to claim 1, wherein the flute body is triangular in cross section.

5. The filter media according to claim 1, wherein the flute body is square in cross section.

6. The filter media according to claim 1, wherein the filter substrate is a felted fiberboard.

7. A filter element to filter a fluid passing therethrough, comprising:
- a filter element body having an element inlet and an element outlet; and
- a filter media disposed within the filter element body, the filter media including:
  - a plurality of parallel flutes, each flute having:
    - a forward flute face;
    - an aft flute face; and
    - a flute body positioned between the forward flute face and the aft flute face, the flute body defining a flute conduit to convey the fluid therethrough, the flute conduit having a flute wall defined by a filter substrate, wherein the fluid is filtered by passing through the filter substrate,
  - the plurality of parallel flutes comprising a set of upstream flutes and a set of downstream flutes alternatively disposed, wherein each downstream flute of the set of downstream flutes is placed adjacent to an upstream flute of the set of upstream flutes, wherein each downstream flute of the set of downstream flutes comprises a forward plug including:
    - a plug base configured to mate with a corresponding forward flute face; and
    - an aerodynamic plug nose having a center axis and a nose surface tapering outwardly from the center axis towards the plug base, the plug nose being configured to aerodynamically redirect a flow of the fluid away from the center axis into the upstream flute placed adjacent to each downstream flute, wherein each downstream flute includes a flute outlet disposed at the aft flute face of each downstream flute, and
  wherein each upstream flute of the set of upstream flutes comprises an aft plug disposed on the aft flute face of each upstream flute, wherein each upstream flute includes a flute inlet disposed at the forward flute face,
  wherein at least one of the forward plug or the aft plug is formed of a material different than the filter substrate.

8. The filter element according to claim 7, wherein the nose surface is a pyramidal surface.

9. The filter element according to claim 7, wherein the nose surface is an ogee surface rotated about the center axis.

10. The filter element according to claim 7, wherein the flute body is triangular in cross section.

11. The filter element according to claim 7, further comprising a forward element seal to seal the filter element in a filter housing.

12. The filter element according to claim 11, further comprising an aft element seal to seal the filter element in the filter housing.

13. The filter element according to claim 7, wherein the filter substrate is a felted fiberboard.

14. A filter assembly to filter a fluid passing therethrough, comprising:
- a filter housing including:
  - a housing inlet;
  - a housing outlet; and
  - a housing body having an internal volume; and
- a filter element disposed within the filter housing, the filter element including:
  - a filter element body having an element inlet and an element outlet; and
  - a filter media disposed within the filter element body, the filter media including:
    - a plurality of parallel flutes, each flute having:
      - a forward flute face;
      - an aft flute face; and
      - a flute body positioned between the forward flute face and the aft flute face, the flute body defining a flute conduit to convey the fluid therethrough, the flute conduit having a flute wall defined by a filter substrate, wherein the fluid is filtered by passing through the filter substrate,
    - the plurality of parallel flutes comprising a set of upstream flutes and a set of downstream flutes alternatively disposed, wherein each downstream flute of the set of downstream flutes is placed adjacent to an upstream flute of the set of upstream flutes, wherein each downstream flute of the set of downstream flutes comprises a forward plug including:
      - a plug base configured to mate with a corresponding forward flute face; and
      - an aerodynamic plug nose having a center axis and a nose surface tapering outwardly from the center axis towards the plug base, the plug nose being configured to aerodynamically redirect a flow of the fluid away from the center axis into the upstream flute placed adjacent to each downstream flute, wherein each downstream flute includes a flute outlet disposed at the aft flute face of each downstream flute, and
    wherein each upstream flute of the set of upstream flutes comprises an aft plug disposed on the aft flute face of each upstream flute, wherein each upstream flute includes a flute inlet disposed at the forward flute face,
    wherein at least one of the forward plug or the aft plug is formed of a material different than the filter substrate.

15. The filter assembly according to claim 14, wherein the nose surface is a pyramidal surface.

16. The filter assembly according to claim 14, wherein the nose surface is an ogee surface rotated about the center axis.

17. The filter assembly according to claim 14, wherein the flute body is triangular in cross section.

18. The filter assembly according to claim 14, further comprising a forward element seal to seal the filter element in the filter housing.

19. The filter assembly according to claim 18, further comprising an aft element seal to seal the filter element in the filter housing.

20. The filter assembly according to claim 14, wherein the filter substrate is a felted fiberboard.

* * * * *